(No Model.)

S. S. HARMAN.
MUCILAGE CUP OR HOLDER.

No. 297,391. Patented Apr. 22, 1884.

WITNESSES:
Dorn Twitchell.
C. Sedgwick

INVENTOR:
S. S. Harman
BY Munn & Co.
ATTORNEYS.

United States Patent Office.

STEPHEN S. HARMAN, OF NEW YORK, N. Y., ASSIGNOR TO HIMSELF AND MORRIS T. LYNCH, OF SAME PLACE.

MUCILAGE CUP OR HOLDER.

SPECIFICATION forming part of Letters Patent No. 297,391, dated April 22, 1884.

Application filed February 2, 1884. (No model.)

*To all whom it may concern:*

Be it known that I, STEPHEN S. HARMAN, of the city, county, and State of New York, have invented a new and Improved Combined Mucilage-Cup Cover and Sponge-Stick, of which the following is a full, clear, and exact description.

Reference is to be had to the accompanying drawings, forming part of this specification, in which similar letters of reference indicate corresponding parts in both the figures.

Figure 1:
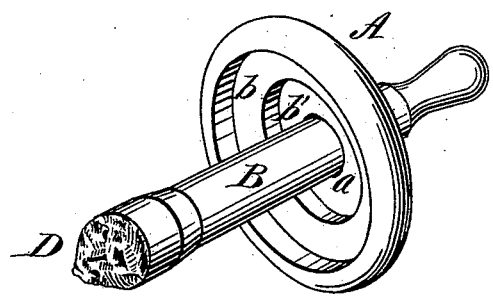
Figure 2:
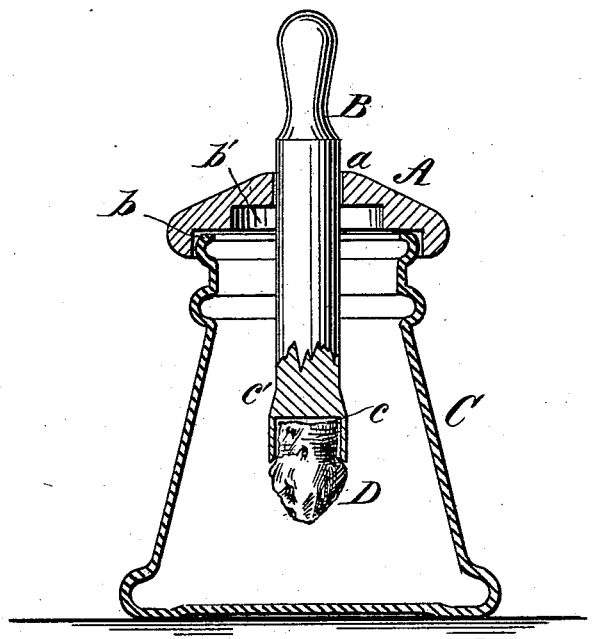

Figure 1 is a perspective view of my invention, and Fig. 2 is a sectional elevation showing the same applied to a mucilage-cup.

This invention consists, principally, of a handle or stick fitted in the cover, and provided at its lower or inner end with a sponge fitted in a socket, or otherwise attached to the stick or handle, for applying the mucilage.

The invention also consists in adapting the cover to fit different sizes of mucilage-cups.

A represents the cover; B, the handle or stick, and C the mucilage-cup, which latter is of the usual form. The cover A has the central passage, $a$, made through it to receive the handle or stick B, and is made saucer-shaped and formed upon the inside with the circular concentric recesses $b$ $b'$, which adapt the cover to be used upon mucilage-cups of different sizes. The handle or stick B fits in the central opening, $a$, made in the cover A, and is cupped or recessed at its lower end, as shown at $c$, to receive the sponge D, which is secured in the cup or recess $c$ by means of cement, glue, or by other suitable means. In this instance the handle B is enlarged near its lower end, as shown at $c'$, where it is made larger than the opening $a$, so that by simply lifting the handle or stick B both the cover and handle may be removed from the cup C, and the enlargement $c'$ is made such a distance above the sponge D that the cover, when resting upon the said enlargement, will not interfere with the use of the sponge for applying the mucilage.

Constructed in the manner described, the device is very convenient, may be applied to most any mucilage-cup, and the sponge D, being held by the stick B, is adapted for applying the mucilage evenly, and thus serves to effect economy in the use of mucilage, and, furthermore, the device is very handy and cheap and desirable.

Having thus described my invention, what I claim as new, and desire to secure by Letters Patent, is—

1. The cover A, formed with the recesses $b$ $b'$, whereby the cover is adapted to be applied to cups of different sizes, in combination with the handle or stick B, having the sponge D attached to its lower or inner end, substantially as and for the purposes set forth.

2. The stick B, fitted in the cover A, enlarged and recessed or cupped at its lower end to receive and hold the sponge D, substantially as described.

STEPHEN S. HARMAN.

Witnesses:
 H. A. WEST,
 C. SEDGWICK.